Dec. 14, 1948.  F. J. AVES  2,456,362
REMOTE CONTROL ADJUSTABLE MIRROR

Filed May 16, 1945  2 Sheets-Sheet 1

Inventor
Fred J. Aves
By C. Lauren Maloby
Attorney

Dec. 14, 1948.                F. J. AVES                    2,456,362
                     REMOTE CONTROL ADJUSTABLE MIRROR
Filed May 16, 1945                                  2 Sheets-Sheet 2
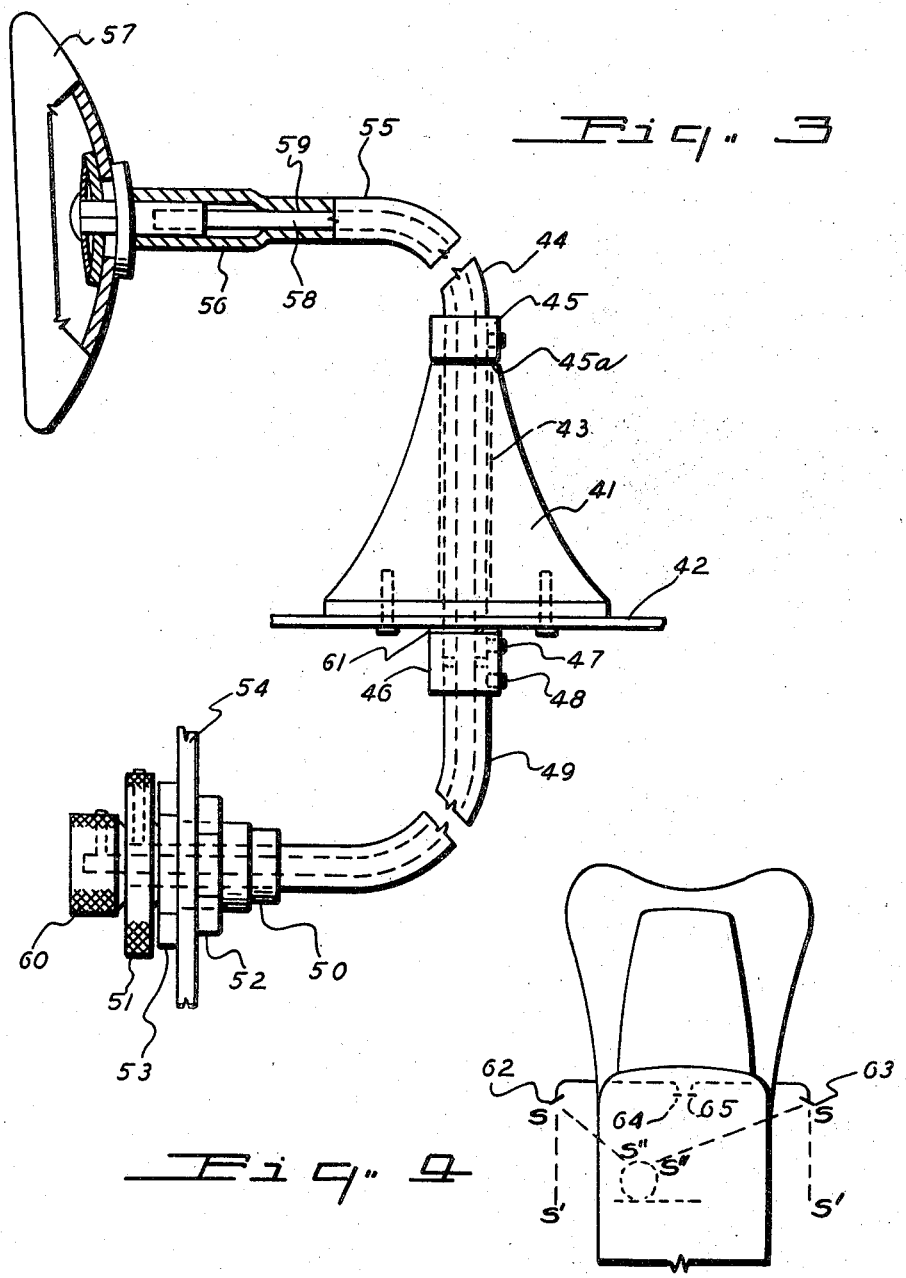

UNITED STATES PATENT OFFICE 2,456,362

REMOTE-CONTROL ADJUSTABLE MIRROR

Fred J. Aves, Beverly Hills, Calif.

Application May 16, 1945, Serial No. 594,004

3 Claims. (Cl. 88—93)

This invention relates to motor vehicle accessory devices, and more especially to a remote control adjustable mirror.

An object of the invention is to provide a simple, practical and efficiently operating mirror device of the character described.

Another object of the invention is to provide a simplified adjustment device for a rear vision mirror which is mounted externally of the body of a motor vehicle.

Another object of the invention is to provide a swivel mounting for an exteriorly mounted rear vision mirror of a motor vehicle, which swivel mounting is adapted for angular adjustment from a control knob or other device conveniently mounted on the dash of the motor vehicle.

A further object of the invention is to provide a novel offset mounting for a mirror on a rotatable shaft which may be operated and controlled from a remote point in such manner that rotation of the shaft provides angular adjustment in the angle of sight of the mirror.

Another object of the invention is to provide an adjustable mirror mounting of the character described of such nature that the mirror may be mounted at almost any place on the vehicle, and yet be satisfactorily actuated by the remote control device embodied in the invention.

A further object of the invention is to provide a mounting for a rear view mirror, as set forth in the preceding objects, however having an additional adjustable feature also remotely actuated, wherein the axis of the operating shaft of the mirror is itself adapted to be changed in either horizontal or vertical position by remote control features similar to those actuating the mirror itself.

Other objects and advantages will appear and be brought out more fully in the following specification, reference being had to the accompanying drawings, wherein:

Fig. 3 is a view similar to Fig. 1 showing a modified form of the invention.

Fig. 4 is a schematic view showing the application of the invention to a motor vehicle employing two of the mirror devices.

Figures 1, 2:
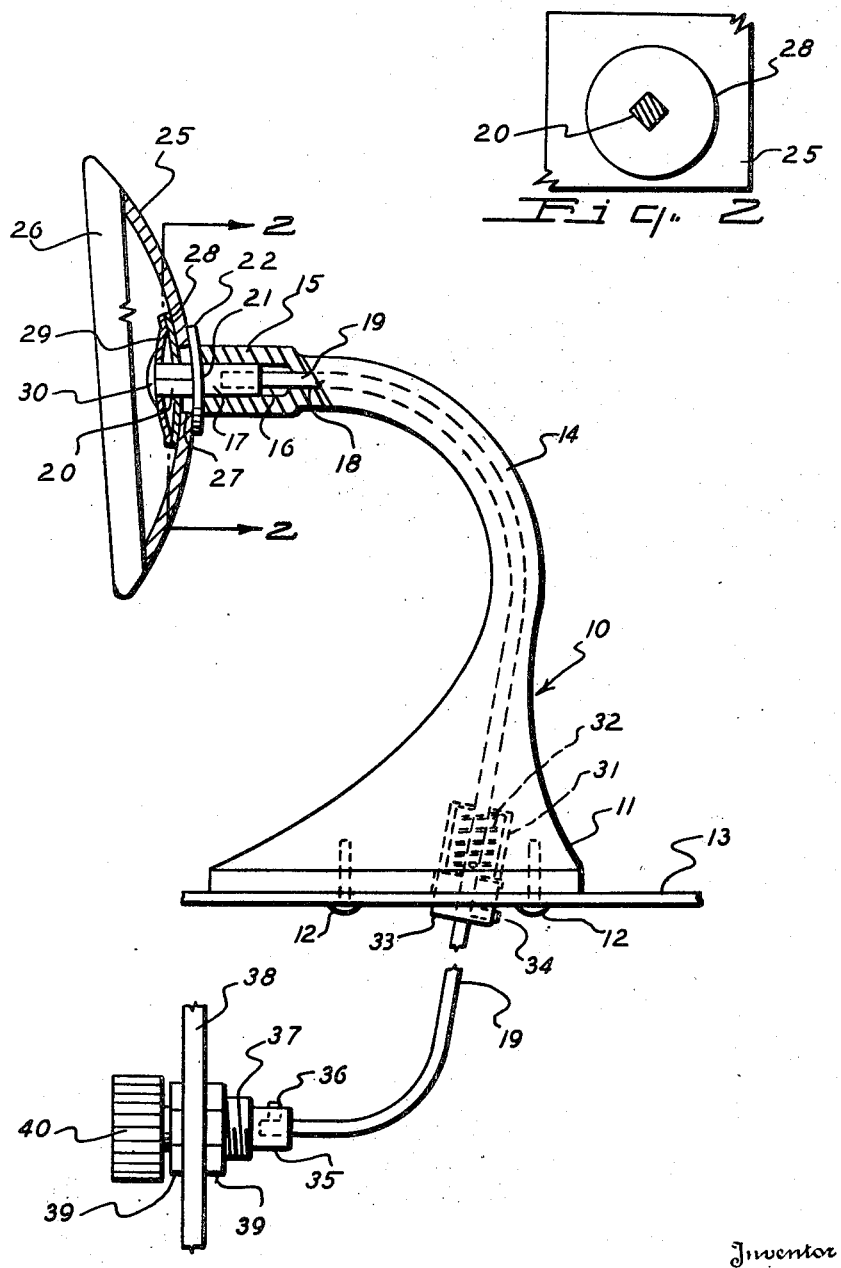
Fig. 1 is a plan view, partly in section, showing an embodiment of my invention.
Fig. 2 is a sectional view taken along the line 2—2 of Fig. 1.

In the operation of vehicles, and particularly motor vehicles, it is customary to provide one or more mirrors directed rearwardly for the assistance of the operator of the vehicle, and while such mirrors are often mounted within the vehicle and within easy reach of the operator thereof, there are many occasions in which improved rear vision is accomplished by mounting the mirror externally of the body of the vehicle and usually at a distance which makes any adjustment therein substantially impossible by the operator during the operation of the vehicle. It is well-known that it is difficult, and as a matter of practicality, impossible to maintain the correct visual angle of such mirrors, and it is therefore the general purpose of this invention to provide a novel mounting for rear vision mirrors in which adjustment of the visual angle of sight can be readily and conveniently made by the operator at all times. Moreover, it is often desirable to change this angle in order to bring into view some portion of the roadway to the rear which is more to one side or the other than is presented in the fixed adjustment of such a mirror, and increased range is therefore possible by the adjustable mirror mounting comprising this invention.

Referring more particularly to the drawings, and especially to Figs. 1 and 2, I show a bracket 10 having a base portion 11 suitably secured as by screws 12 on a frame portion 13 of a motor vehicle. Bracket 10 has an arm portion 14 extending laterally, and has an enlarged end 15 forming a bearing bore 16 for a bearing member 17 rotatable therein. Body 11 and arm portion 14 are formed with a bore 18 through which extends a flexible rotatable shaft 19, the end of which engages in a recess in bearing member 17 and is suitably secured thereto by a fixed connection such as a key or by being welded thereto.

Bearing member 17 has a reduced square section end portion 20 providing a shouldered seat 21 for a washer 22 which has a corresponding squared aperture. A parti-spherical frame 25 mounts a rear vision mirror 26 and is provided with an enlarged aperture 27 through which portion 20 of bearing member 17 extends. A washer 28 and a resilient washer 29, each having squared apertures, are positioned on portion 20, as shown, and held by a shouldered head 30 of bearing member 17. Frame 25 is thus clamped between washers 22 and 28 and held in clamped position with washer 22 engaging seat 21 by a longitudinal tension applied to shaft 19 in a manner about to be described. Base 11 is formed with a recess 31 in which is positioned a compression spring 32 and held therein by a collar 33 secured on shaft 19 as by a set screw 34.

Shaft 19 extends inwardly from bracket 10 and is connected to a bearing shaft member 35 as by set screw 36 or otherwise. Shaft 35 is rotatably mounted in a tubular member 37 which extends through and is secured to a dash frame member 38 by means of lock nuts 39 or other equivalent mounting means. Shaft 35 is provided with an operating knob 40.

The operation of the invention, as described, should be clear from the foregoing description. As can be clearly seen in Fig. 1 aperture 27 in the mirror frame 25 is considerably larger in diameter than the outside diameter of end portion 20 of member 17 which permits the frame to be secured so that the plane of the mirror does not make a right angle with the axis of rotation of bearing member 17. By turning knob 40 shaft 19 turns and rotates bearing member 17 and the mirror and frame structure, and the mirror is thus turned so as to present for viewing objects to the rear of the motor vehicle through an angular range, the amount of which is determined by the angle made by a perpendicular to the mirror and the axis of rotation of bearing member 17. It will be understood that this angle may be changed if desired by loosening the engagement of washers 22 and 28 by releasing collar 33 from shaft 19, as should be obvious. It will be understood, however, that after this setting has been made, the engagement of washers 22 and 28 with frame 25 and seat 21 is semi-permanent and will not be subject to accidental shifting during ordinary operation of the vehicle.

In Fig. 3 I show a modified form of my invention. In this figure I show a bracket 41 secured to the vehicle frame plate member 42, the bracket having a bore 43 through which extends a rigid hollow arm 44 and having a portion adapted for rotation therein. A collar 45 is suitably formed integral with or secured to arm 44 and has a thrust engagement with the face portion 45a of member 41. A collar 46 is secured to the end of arm 44 as by set screw 47 and is secured as by set screw 48 to a flexible tube 49, the opposite end of which is connected through a suitable sleeve 50 to an operating knob 51, sleeve 50 being secured as by lock nuts 52 and 53 to a dash frame plate or other member 54. Arm 44 has an angularly extending portion 55 provided with an enlarged end 56 similar to end 15 on which a mirror unit 57 is mounted in a manner similar to that of Fig. 1. The mirror rotating shaft 58 extends through a bore 59 in arm 44 and through the tubular passage formed by flexible tube 49 and is secured to and is rotatable by an operating knob 60. A suitable resilient bearing collar 61 is positioned between collar 46 and frame plate 42 and may comprise a C-spring or the like to prevent rotation of arm 44 in bracket 41, except by operation of knob 51, thus maintaining arm portion 55 in any position to which it may have been set.

The operation of the invention of Fig. 3 should be obvious and is similar to that of Fig. 1 with the addition of the adjustment of arm 44, whereby the angle of vision of mirror 57 may be changed beyond the limits defined by the angular mounting of the mirror on the end of shaft 58.

In Fig. 4 I show schematically the pair of mirrors 62 and 63 mounted on the left and right sides of a motor vehicle respectively, and showing operating knobs 64 and 65 mounted on the dash.

The invention, as shown and described hereinabove, has been illustrated in connection with a motor vehicle, however, it will be understood that the mechanism shown and described is illustrative rather than restrictive of the invention, and that changes and modifications may be made without departing from the spirit and scope of the sub-joined claims. For instance, it should be obvious that a mirror mounting, as disclosed herein, is applicable to streetcars, trains and the like, or may be provided in any other place where it is desired to position a mirror and providing a remote control adjustment of the angle of vision thereof.

The bracket 14 or 41, when attached to the vehicle, supports the mirror in a position in which its axis of rotation extends generally fore and aft of the vehicle as indicated in the figures, but is inclined rearwardly and toward the vehicle sufficiently so that the axis of the conical field of vision, which is generated by rotation of the mirror, will extend directly rearwardly from the mirror. The conical field of vision referred to is that which is generated by the sweep of the line S—S' (Figure 4) in a conical path as the mirror is rotated. The line of sight S—S' is the reflection of the line of sight S—S'' from the eyes of the vehicle operator to the mirror.

Having thus described my invention, what I claim and desire to secure by Letters Patent is:

1. A remotely controlled adjustable rear view mirror for a motor vehicle, comprising: a bracket for attachment to a motor vehicle; said bracket having an end portion adapted for attachment to the side of a vehicle and a hollow rigid arm including a goose-neck portion the end of which, when the bracket is thus attached, is arranged with its axis extending fore and aft with relation to the vehicle; a shaft journalled in said bore, a mirror, a frame in which said mirror is mounted, said frame being secured directly on the rear end of said shaft with the mirror disposed in a plane substantially normal to the axis of said shaft but slightly inclined with reference to the normal whereby rotation of said shaft will rotate the mirror so as to cause the line of sight from the mirror to sweep a conical field of vision about an axis extending rearwardly from the mirror, an operating knob for said shaft, a flexible shaft extending through said hollow arm, rotatable therein and supported thereby, one end of said flexible shaft being secured to the first mentioned shaft and the other end being secured to said knob and friction bearing means comprising a shaft collar and a bearing seat for said collar on said bracket.

2. A rear view mirror mechanism for attachment to a motor vehicle, comprising: a rigid bracket including a base portion attachable to a side surface of the vehicle and a hollow arm including a goose neck portion terminating in a bearing part that extends rearwardly, with its axis disposed fore and aft with reference to the vehicle when the bracket is thus attached, said bracket having a longitudinally curved bore extending from said bearing part through said goose neck portion and through said base portion, a shaft element journalled in said bearing part, a mirror, a mirror frame in which said mirror is mounted, said frame being mounted upon said shaft element with the mirror disposed in a plane subtending a slight angle with reference to a plane normal to the axis of said shaft element, whereby rotation of said mirror will cause the line of sight thereof to sweep a complete conical path about an axis extending rearwardly from the mirror to provide a circular field of vision behind the vehicle, and remote control means including a flexible shaft attached to said shaft part, extending through said bore into the vehicle, and having at its inner end an operating knob for rotating the same.

3. A remotely controlled adjustable rear view mirror for a motor vehicle, comprising: an outboard bracket including an end portion adapted for attachment to the side of a vehicle and including a rigid hollow arm having a goose-neck portion the outer end of which extends generally horizontally and rearwardly when the bracket is thus attached; a bearing in said outer end of said goose-neck portion, the axis of said bearing being disposed generally fore and aft with relation to the vehicle; a shaft journalled in said bearing; a mirror; a frame in which said mirror is mounted, said frame being secured directly on the rear end of said shaft with the mirror disposed in a plane substantially normal to the axis of said shaft but slightly inclined with reference to the normal whereby rotation of said shaft will rotate the mirror so as to cause the line of sight from the mirror to sweep a conical field of vision about an axis extending rearwardly from the mirror; an operating knob adapted to be disposed within the vehicle, and a flexible shaft extending through and supported within said hollow arm and rotatable therein, one end of said flexible shaft being connected to the first mentioned shaft and the other end being connected to said operating knob.

FRED J. AVES.

REFERENCES CITED

The following references are of record in the file of this patent:

UNITED STATES PATENTS

| Number | Name | Date |
| --- | --- | --- |
| 1,206,871 | Locke | Dec. 5, 1916 |
| 1,362,856 | Drake et al. | Dec. 21, 1920 |
| 1,672,900 | Nichols | June 12, 1928 |
| 1,740,909 | Shaw | Dec. 24, 1929 |
| 1,844,675 | Oishei | Feb. 9, 1932 |
| 1,859,682 | Ramstead | May 24, 1932 |
| 1,913,874 | Folberth et al. | June 13, 1933 |
| 1,956,518 | Paulus | Apr. 24, 1934 |
| 2,148,794 | Ashdown | Feb. 28, 1939 |
| 2,248,833 | Thibault et al. | July 8, 1941 |
| 2,281,234 | Clark | Apr. 28, 1942 |
| 2,311,186 | Lobdell | Feb. 16, 1943 |
| 2,326,316 | Allen | Aug. 10, 1943 |
| 2,330,444 | Park | Sept. 28, 1943 |
| 2,405,731 | Beggs et al. | Aug. 13, 1946 |

FOREIGN PATENTS

| Number | Country | Date |
| --- | --- | --- |
| 545,469 | Great Britain | May 28, 1942 |